United States Patent Office 2,974,136
Patented Mar. 7, 1961

2,974,136

PENICILLIN SALTS

Erling Juhl Nielsen, Charlottenlund, Denmark, assignor to Løvens kemiske Fabrik ved A. Kongsted, Copenhagen, Denmark, a firm No Drawing. Filed Jan. 3, 1956, Ser. No. 556,773

Claims priority, application Great Britain Oct. 19, 1955

2 Claims. (Cl. 260—239.1)

This invention relates to novel penicillin compounds which are sparingly soluble in water and, on account thereof, can be used for the production of pharmaceutical preparations of penicillin which form by parenteral injection, for instance subcutaneously or intramuscularly, a depot from which penicillin is slowly resorbed.

The novel salts of penicillin have other valuable properties which make them suitable for other purposes.

Sparingly soluble penicillin salts are widely used for producing pharmaceutical preparations having a retarded penicillin effect. The salt of penicillin most commonly employed for this purpose is procaine penicillinate which, however, suffers from certain drawbacks. Thus the basic component thereof is in itself an anaesthetic widely used in medical practice, and in some patients allergic effects are noted. In such cases fatal results may be caused by administering the penicillin salt thereof. Other examples of well known penicillin salts sparingly soluble in water are the penicillin salts of substituted alkylenediamines, such as N,N'-dibenzylethylenediamine. However, among other disadvantages this salt also presents the disadvantage of containing an amine component, which may have undesirable physiological effects.

In the case of the abovenamed salts it has generally been claimed that they can be produced from various kinds of penicillin, although the products in actual use have generally been the salts of benzyl penicillin.

It has, however, been known for some time that a great variety of different penicillins may be produced by growing a penicillin-producing mold in association with a culture medium containing a nutrient material and a selected precursor compound, said penicillins being represented by the formula:

$$R—O—C_{10}H_{13}N_2O_4S$$

in which R is a member of the class consisting of aliphatic radicals containing from 2 to 6 carbon atoms, phenyl and monosubstituted phenyl.

The free acid of the penicillin of the latter kind in which R is phenyl has recently acquired considerable interest, because it has been found that this free penicillin acid displays a remarkable stability against acids. Consequently this compound is of special utility for oral administration since, unlike the ordinary penicillins, this penicillin is not destroyed by the acid contents of the stomach, but can pass through the stomach without considerable losses of potency into the intestine where it can be absorbed. Since, moreover, the free acid form of the said penicillin is only slightly soluble in water, it can readily be prepared in solid crystalline form, for instance merely by adding a mineral acid to a solution of an alkali metal salt of the said penicillin.

Although the penicillin having the formula stated above in which R is phenyl has occasionally been termed phenoxy penicillin in literature which term is in accordance with the formula given above, it is here preferred to call it phenoxymethyl penicillin and to represent it by the formula:

$$R'C_9H_{11}N_2O_4S$$

in which R' is a phenoxymethyl radical: $C_6H_5—O—CH_2$. This manner of designating the penicillin in question is analogous to the commonly applied designation of benzylpenicillin for the penicillin which has the formula $$C_6H_5·CH_2·C_9H_{11}N_2O_4S$$

I have now discovered a hitherto unknown calcium salt of phenoxymethyl penicillin which is characterized in that it has the form of crystals having a solubility in water at 20° C. of about 1.1%. It has no well defined melting point since, unlike the solid crystalline phenoxymethyl penicillin acid which is stated to melt at about 120–128° C., it will be destructed by heating. Thus, it begins to take a yellow colour at about 175° C. and becomes brownish black at about 200–210° C., a slight development of gas being observable.

On determining the water content of the solid crystalline calcium salt of phenoxymethyl penicillin by the Karl Fischer method, values between 4 and 5% are found; the values observed appear to center around the value 4.65% $H_2O$ calculated for $(C_{16}H_{17}N_2O_5S)_2Ca,2H_2O$ and it is believed that the salt is represented by this formula.

By producing unsaturated aqueous solutions of the calcium salt of phenoxymethyl penicillin, and subjecting such solutions to free-drying in vacuum, solid dry products will be obtained which are not crystalline. By dissolution in water these products will form clear solutions from which, after a short time, the new crystalline calcium salt of phenoxymethyl penicillin will crystallize. The freeze-dried product cannot generally be obtained in anhydrous state, but a considerable content of water, say 6% as determined by the Karl Fischer titration, will be found therein. As mentioned above, however, the product is not crystalline and moreover it differs from the salt according to the invention by its abovenamed capability of dissolving in water to form solutions from which the crystalline salt will precipitate.

By drying the freeze-dried calcium salt over phosphorus pentoxide it is possible to reduce its water content to below 0.5% determined as mentioned above, but still no crystalline product will be obtained.

The crystalline calcium salt of phenoxymethyl penicillin can be produced by reacting a solution containing a substance dissociating phenoxymethyl penicillin ions with a calcium salt or with calcium hydroxide, the concentration exceeding the solubility of the crystalline calcium salt of phenoxymethyl penicillin in the solvent used. The reaction may be performed in water or an aqueous medium or in an organic solvent in which the free phenoxymethyl penicillin acid or the salt thereof is soluble, provided that the amount of water necessary for the crystallization is present in the solution.

When using the free phenoxymethyl penicillin acid in the form of a solution of the same in butyl or amyl acetate, such as obtained during the commonly used method for concentrating and purifying the crude phenoxymethyl penicillin formed in the culture medium, the said solution may be treated with an aqueous solution or suspension of calcium hydroxide, in the latter case preferably by adding the suspension to the solution of phenoxymethyl penicillin while stirring the mixture vigorously.

When the penicillin acid, for instance in form of a solution of the said kind, is reacted with a calcium salt, this salt should be a salt of an acid having a lower dissociation constant than that of phenoxymethyl penicillin acid.

When a water-soluble salt of phenoxymethyl penicillin is available, such as the sodium, potassium, or ammonium salt, or an amine salt of the penicillin, such as the cyclohexylamine salt, it is preferable to produce the calcium salt by mixing an aqueous solution of the phenoxymethyl penicillin salt with an aqueous solution of a water-soluble calcium salt, for example calcium chloride. All the reactions described must be carried out at a sufficiently low temperature to avoid loss of penicillin activity, preferably below 40° C.

In the following a number of examples of producing the new calcium salt are given.

EXAMPLE 1

58.5 g. of potassium phenoxymethyl penicillinate were dissolved at 20° C. in 365 ccs. of water in which were previously added 10 ccs. of a 2-normal aqueous solution of sodium acetate in order to keep the pH of the solution between 7 and 8 during the subsequnt addition of calcium chloride, which may contain some HCl. Thereafter, 60 ccs. of a half-saturated aqueous solution of calcium chloride at 20° C. were slowly added under stirring. The crystals, which precipitated out, were washed with water, and then with acetone and dried in vacuum over phosphorus pentoxide. Yield: 55.4 g. The product assayed 1554 international penicillin units pro mg., when determined iodometrically, and it contained 4.60% of water as determined by the Karl Fischer titration. The solubility in water at 20° C. was 1.10% and at 0° C. 1.09%, the difference being, however, within the reliability of the determination.

EXAMPLE 2

To a solution of sodium phenoxymethyl penicillinate (0.37 g. corresponding to 0.001 mole) in 80% ethanol (6 ccs.) is added a solution of calcium chloride (0.17 g.) in 80% ethanol (2 ccs.). The calcium phenoxymethyl penicillinate is filtered off, washed with water and acetone and dried. Yield 0.27 g. corresponding to 69% of the theoretical.

EXAMPLE 3

To a solution of ammonium phenoxymethyl penicillinate (0.37 g. corresponding to 0.001 mole) in water (4 ccs.) is added a suspension of calcium hydroxide (0.04 g.) in water. The mixture is shaken vigorously for 15 minutes and the calcium phenoxymethyl penicillinate is filtered off, washed with water and dried. Yield 0.20 g.

EXAMPLE 4

To a solution of phenoxymethyl penicillin (0.35 g. corresponding to 0.001 mole) in a mixture of amyl acetate (8 ccs.) and ethanol (2 ccs.) is added a suspension of calcium hydroxide (0.04 g.) in water (4 ccs.). The mixture is shaken for 15 minutes and the crystals are collected. Yield 0.25 g. corresponding to 64% of the theoretical.

EXAMPLE 5

A solution of diisopropylammonium phenoxymethyl penicillinate (0.42 g. corresponding to 0.001 mole) in a mixture of water (3 ccs.) and ethanol (2 ccs.) is mixed with a saturated, aqueous solution of calcium chloride (0.4 cc.). The calcium phenoxymethyl penicillinate is collected by filtration, washed with water and dried. Yield 0.30 g. corresponding to 77.5% of the theoretical.

EXAMPLE 6

To a solution of tert. butylammonium phenoxymethyl penicillinate (0.42 g. corresponding to 0.001 mole) in water (3 ccs.) is added a saturated, aqueous solution of calcium chloride (0.4 cc.). The yield of calcium phenoxymethyl penicillinate is 0.37 g. corresponding to 95.5% of the theoretical.

EXAMPLE 7

To a solution of isopropylammonium phenoxymethyl penicillinate (0.41 g. corresponding to 0.001 mole) in a mixture of water (3 ccs.) and ethanol (1 cc.) is added a saturated, aqueous solution of calcium chloride (0.4 cc.). The calcium phenoxymethyl penicillinate is collected by filtration, washed with water and dried. Yield 0.37 g.

EXAMPLE 8

To a solution of N.N-dimethyl-β-hydroxyethylammonium phenoxymethyl penicillinate (0.44 g. corresponding to 0.001 mole) in water (3 ccs.) is added a saturated, aqueous solution of calcium chloride (0.4 cc.). The yield of calcium phenoxymethyl penicillinate is 0.37 g.

EXAMPLE 9

To a solution of 3-methoxypropylammonium phenoxymethyl penicillinate (0.44 g. corresponding to 0.001 mole) in water (3 ccs.) is added a saturated aqueous solution of calcium chloride. The yield of calcium phenoxymethyl penicillinate is 0.37 g.

EXAMPLE 10

To a suspension of cyclohexylammonium phenoxymethyl penicillinate (0.45 g.) in 96% ethanol (5 ccs.) is added a solution of calcium acetate (0.1 g.) in water (1 cc.). A clear solution results and the calcium phenoxymethyl penicillinate begins to crystallize. Yield 0.20 g. corresponding to 51.5% of the theoretical.

EXAMPLE 11

To a solution of phenoxymethyl penicillin (0.35 g.) in 96% ethanol (5 ccs.) is added a solution of calcium acetate (0.1 g.) in water (1 cc.). The calcium phenoxymethyl penicillinate is filtered off, washed with water, acetone and dried. Yield 0.30 g. corresponding to 77.5% of the theoretical.

EXAMPLE 12

To a suspension of phenoxymethyl penicillin (0.35 g.) in water (2 ccs.) is added a solution of calcium acetate (0.3 g.) in water (3 ccs.). The phenoxymethyl penicillin dissolves and calcium phenoxymethyl penicillinate begins to crystallize. Yield 0.36 g. corresponding to 93% of the theoretical.

EXAMPLE 13

To a suspension of phenoxymethyl penicillin (0.35 g.) in water (5 ccs.) is added precipitated calcium carbonate (0.05 g.). The mixture is shaken vigorously for 30 minutes, whereafter the calcium phenoxymethyl penicillinate is collected by filtration. Yield 0.30 g. corresponding to 77.5% of the theoretical.

EXAMPLE 14

To a solution of phenoxymethyl penicillin (0.35 g.) in a mixture of amyl acetate (5 ccs.) and ethanol (1.5 ccs.) is added a suspension of precipitated calcium carbonate (0.05 g.) in water (5 ccs.). The mixture is shaken vigorously for one hour and the calcium phenoxymethyl penicillinate is filtered off, washed with water and acetone and dried. Yield 0.25 g.

EXAMPLE 15

To a solution of sodium phenoxymethyl penicillinate (11.5 g.) in water (72 ccs.) is added dropwise with stirring a solution of calcium chloride (3.66 g.) in water (12 ccs.). The calcium phenoxymethyl penicillinate is filtered off, washed with water and acetone and dried at 80° C. Yield: 11.1 g. corresponding to 95.7% of the theoretical.

Owing to the low solubility of the described calcium salt of phenoxymethyl penicillin a protracted penicillin effect can be obtained by subcutaneous or intramuscular injection of suspensions of this salt. To increase the chemical stability of the phenoxymethyl penicillin a content of Ca-ions exceeding that of the calcium salt of the phenoxymethyl penicillin may be incorporated with the suspension medium, for instance by adding to the suspension a soluble salt of calcium other than the phenoxymethyl penicillin salt, for instance calcium chloride.

This reduces the solubility of the calcium salt of phenoxymethyl penicillin and in consequence thereof augments its chemical stability. In order to prevent precipitation of the suspended crystals in the form of a layer or cake which cannot readily be re-suspended in the suspension medium, agents capable of increasing the viscosity of the suspension medium may be added. Such agents are well known, examples of them being carboxymethyl cellulose, polyvinyl pyrrolidone and gelatin. Furthermore, to facilitate re-suspension a surface active substance may be added, for instance lecithin, surface active amine salts, such as cetyl pyridinium chloride, or tweens.

Examples of suspensions are:

EXAMPLE 16

An aqueous solution of polyvinyl pyrrolidone containing 20 g. per 100 ccs. is prepared and heated to 120° C. for 20 minutes in an autoclave. To the solution thus sterilized a growth-inhibiting agent is added, for instance phenyl mercuric acetate in such an amount that the concentration will be 1:20,000.

Sterile calcium salt of phenoxymethyl penicillin containing particles of sizes between the limits 20 and 60µ is passed under aseptic conditions through a sieve the mesh width of which is 0.13 mm. 30 g. of the substance that have passed the sieve are stirred into 50 ccs. of the polyvinyl pyrrolidone solution until uniform suspension has been attained, after which more polyvinyl pyrrolidone solution is added until the volume is 100 ccs. and the suspension is homogenized in a homogenization apparatus.

EXAMPLE 17

1.2 g. lecithin are dissolved in 60 ccs. ether and the solution is sterilized through a glass filter G5. 60 g. sterile calcium phenoxymethyl penicillinate having a particle size of 20–60µ are stirred into the solution until all the particles are moistened therewith and subsequently the ether is removed by evaporation in vacuo or at slight heat. The dried substance is passed aseptically through a sieve the mesh width of which is 0.13 mm.

2.7 g. carboxymethyl cellulose are dissolved in water with vigorous agitation in a Waring Blendor and the solution obtained is heated to 120° C. for 20 minutes after which phenyl mercuric aectate is added to make a concentration of this substance of 1:20,000 in the solution. The viscosity measured by a rotation viscosimeter should be 35–40 cp. at 20° C.

30.0 g. of the sterile calcium salt of phenoxymethyl penicillin treated with lecithin as described above is stirred into 50 ccs. of the sterile solution of carboxymethyl cellulose to form a uniform suspension, after which more of the solution is added to form 100 ccs. of the solution which is then homogenized in a homogenization apparatus. The resulting suspension contains 300 mg. of the calcium salt per cc.

By using such suspensions for intramuscular injections in normal persons the following penicillin concentration in the serum are found after the intervals stated, each injection containing 200 mg. of the calcium salt of phenoxymethyl penicillin, the concentrations of penicillin in the serum measured after injection of 300 mg. procaine benzyl penicillin being given for comparison.

Table I

PHENOXYMETHYL PENICILLIN (GIVEN AS CALCIUM SALT) (µG. PER CC. SERUM)

| Subjects | 1 h. | 2 h. | 4 h. | 8 h. | 12 h. | 24 h. |
|---|---|---|---|---|---|---|
| A | 1.9 | 1.1 | 0.2 | 0.06 | 0.06 | 0.06 |
| B | 0.7 | 0.6 | 0.3 | 0.25 | 0.15 | 0.06 |
| C | 1.7 | 1.1 | 0.5 | 0.08 | 0.06 | 0.06 |
| D | 1.8 | 0.8 | 0.1 | 0.07 | 0.06 | 0.06 |
| E | 0.3 | 0.2 | 0.2 | 0.28 | 0.17 | 0.06 |
| Average | 1.3 | 0.76 | 0.26 | 0.15 | 0.10 | 0.06 |
| 300 mg. procaine penicillin | 0.59 | 0.42 | 0.40 | 0.45 | 0.38 | 0.04 |

Table I shows that during the first two hours the calcium salt produces higher penicillin concentrations in the serum than does the procaine salt of benzyl penicillin and that the calcium salt has a protracted effect a little less pronounced than that of procaine benzyl penicillinate.

Preparations for oral use can be produced in the well known way and in well known forms such as pills, tablets, or capsules. An example showing a manner of producing a tablet suitable for oral use is as follows:

EXAMPLE 18

200 g. of the new calcium salt of phenoxymethyl penicillin are thoroughly mixed with 60 g. potato starch and 20 g. kaolin and the mixture is granulated with an aqueous solution of 4% gelatin after which the granulate is completely dried. It is then mixed with 35 g. potato starch and 35 g. talcum after which the mixture is analyzed, and compressed to tablets of such a weight, that each tablet will contain 200 mg. of phenoxymethyl penicillin.

The serum concentrations in normal persons after oral administration of one such tablet are compared in the following Table II with the serum concentration obtained by administering tablets of the potassium salt of phenoxymethyl penicillin in the amount of one tablet containing 200 mg. of phenoxymethyl penicillin.

Table II

PHENOXYMETHYL PENICILLIN (GIVEN AS CALCIUM SALT) (µG. PER CC. SERUM)

| Subjects | ½ h. | 1 h. | 2 h. | 4 h. | 6 h. | 7 h. |
|---|---|---|---|---|---|---|
| A | 0.11 | 1.3 | 1.4 | 0.20 | | |
| B | 0.24 | 1.2 | 0.9 | 0.15 | | |
| C | 0.22 | 1.8 | 2.4 | 0.28 | 0.04 | 0.03 |
| D | 0.08 | 1.3 | 0.61 | 0.12 | | |
| E | 0.35 | 1.8 | 0.52 | 0.10 | | |
| Average | 0.20 | 1.5 | 1.2 | 0.17 | | |

PHENOXYMETHYL PENICILLIN (GIVEN AS POTASSIUM SALT) (µG. PER CC. SERUM)

| Subjects | ½ h. | 1 h. | 2 h. | 4 h. | 6 h. | 7 h. |
|---|---|---|---|---|---|---|
| A | 0.12 | 0.35 | 0.76 | 0.43 | | |
| B | 0.26 | 1.1 | 0.82 | 0.14 | | |
| C | 0.07 | 0.22 | 1.7 | 0.50 | 0.07 | 0.05 |
| D | 0.40 | 1.1 | 0.90 | 0.13 | | |
| E | 0.10 | 0.48 | 0.46 | 0.04 | | |
| Average | 0.19 | 0.65 | 0.93 | 0.25 | | |

The table shows that the calcium salt is equivalent to the potassium salt. The calcium salt is, however, free of foreign penicillins produced by the fungi, for instance penicillin K.

I claim:

1. The salt $Pen_2Ca,2H_2O$, where Pen represents the phenoxymethyl penicillin ion:

$$C_6H_5—O—CH_2—C_9H_{10}N_2O_4S$$

2. An injectable aqueous suspension consisting essentially of a solid crystalline calcium salt of phenoxymethyl penicillin as set forth in claim 1, in amount of from about 200 to 300 mg. per cc.

References Cited in the file of this patent

UNITED STATES PATENTS 2,562,410    Behrens et al. _____ July 31, 1951